(12) United States Patent
Riggins et al.

(10) Patent No.: US 10,636,307 B2
(45) Date of Patent: Apr. 28, 2020

(54) BROADCASTING SYSTEM FOR AUTONOMOUS VEHICLES

(71) Applicant: The Boeing Company, Chicago, IL (US)

(72) Inventors: Bruce E. Riggins, Whittier, CA (US); Peter Bystrom, Cypress, CA (US); Keith E. Cok, Cypress, CA (US); Elizabeth D. Briones, Lakewood, CA (US); Michael A. Carralero, Huntington Beach, CA (US); Tanner Scott Clark, Newport Beach, CA (US); Andrew J. Hawkins, Long Beach, CA (US); Allen Muroi, Fullerton, CA (US); Steven Warren Stakley, Dove Canyon, CA (US); Klaasjan Hendrik van Gelder, Long Beach, CA (US); Michael A. Beoletto, Trabuco Canyon, CA (US); Eric Allen Moore, Knoxville, TN (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 15/710,310

(22) Filed: Sep. 20, 2017

(65) Prior Publication Data

US 2019/0088132 A1 Mar. 21, 2019

(51) Int. Cl.
*G08G 1/16* (2006.01)
*G05D 1/00* (2006.01)
(Continued)

(52) U.S. Cl.
CPC .......... *G08G 1/161* (2013.01); *G01S 13/931* (2013.01); *G05D 1/0088* (2013.01);
(Continued)

(58) Field of Classification Search
CPC ...... G08G 1/161; G08G 1/166; G05D 1/0088; G05D 1/0278; G05D 1/0297;
(Continued)

(56) References Cited

U.S. PATENT DOCUMENTS

2007/0043502 A1\* 2/2007 Mudalige .................. B60T 7/22
701/301

OTHER PUBLICATIONS

Audi USA Homepage, "Audi announces the first vehicle to infrastructure (V2I) service—the new Traffic light information system"; https://www.audiusa.com/newsroom/news/press-releases/2016/08/audi-announces-first-vehicle-to-infrastructure-service; 5 pages (Aug. 15, 2016).

(Continued)

*Primary Examiner* — Brian P Sweeney
(74) *Attorney, Agent, or Firm* — Sage Patent Group (57) ABSTRACT

A broadcasting system for an autonomous vehicle is disclosed and includes an antenna, a plurality of sensors, one or more processors, and a memory coupled to the processors. The antenna is configured to send and receive wireless communication, and the antenna receives publically available wireless signals. The sensors are configured to generate signals indicating a real-time velocity and a real-time direction of travel of the autonomous vehicle. The processors are in communication with the antenna and the plurality of sensors. The memory stores data comprising program code that, when executed by the one or more processors, causes the system to receive as input the publically available wireless signals and the signals indicating the real-time velocity and the real-time direction of travel of the autonomous vehicle. The system is further caused to determine a real-time velocity and real-time direction of travel of autonomous vehicle.

29 Claims, 5 Drawing Sheets

(51) Int. Cl.
  *G01S 13/93*    (2020.01)
  *G01S 13/931*   (2020.01)
  *G05D 1/02*     (2020.01)
  *B60K 31/00*    (2006.01)

(52) U.S. Cl.
  CPC ......... *G05D 1/0278* (2013.01); *G05D 1/0297* (2013.01); *G08G 1/166* (2013.01); *B60K 2031/0033* (2013.01); *B60W 2550/408* (2013.01); *G01S 2013/936* (2013.01); *G01S 2013/9353* (2013.01); *G05D 2201/0213* (2013.01)

(58) Field of Classification Search
  CPC .......... G05D 2201/0213; G01S 13/931; G01S 2013/936; G01S 2013/9353; B60W 2550/408; B60K 2031/0033
  USPC ........................................................ 701/301
  See application file for complete search history.

(56) References Cited

OTHER PUBLICATIONS

GuruFocus; "Ford Reveals Plans for Autonomous Vehicles"; http://www.gurufocus.com/news/444988/ford-reveals-plans-for-autonomous-vehicles; 4 pages (Sep. 22, 2016).
Versprille, Allyson; "Researchers Hack Into Driverless Car System, Take Control of Vehicle"; NDIA's Business & Technology Magazine; http://www.nationaldefensemagazine.org.articles/2015/5/1/2015may-researchers-hack-into-driverless-car-system-take-control-of-vehicle 4 pages, (May 1, 2015).

\* cited by examiner

BROADCASTING SYSTEM FOR AUTONOMOUS VEHICLES

FIELD

The disclosed system and method relates to autonomous vehicles and, more particularly, to a secure broadcasting system for an autonomous vehicle that communicates real-time movement by wireless signals and receives wireless signals indicating a real-time movement of other vehicles located within proximity of the autonomous vehicle.

BACKGROUND

Autonomous vehicles may be used to navigate land, bodies of water, or airspace. Some examples of autonomous vehicles include, but are not limited to, automobiles, motorized bicycles, unmanned aerial vehicles (UAV), aircraft operated during ground control, motorboats, or even industrial vehicles such as forklifts that are used on a factory floor. An autonomous vehicle navigates a roadway or other environment with either limited or no input at all from a driver. Autonomous vehicles include numerous sensors that collect information about various stationary and moving objects in the vicinity of the autonomous vehicle such as, for example, other vehicles or pedestrians. A trajectory for the autonomous vehicle to follow may be determined based on the information collected by the sensors. For example, the sensors may indicate that the autonomous vehicle is approaching an obstacle. Accordingly, the vehicle navigates itself around the obstacle. Autonomous vehicles may also utilize other sensing modalities, such as, for example, cameras, thermal cameras, ultrasonic devices, and radar devices, to detect obstacles and localize the vehicles in their operating environment.

Various environmental conditions and situations exist that tend to reduce the effective range of the sensors, cameras, and radars. For instance, cameras provide visual information, but require software that is sometimes prone to errors when interpreting data. Furthermore, radars such as Light/Laser Detection and Ranging (LiDAR) provide proximity information, but have limitations with their line-of-sight. Current sensor technology is also line-of-sight limited, thus requiring interpreted observation before action can be determined. Accordingly, it may be difficult for a vehicle to detect crucial incidents such as emergency braking, flat tires, or pedestrian traffic flow interference that are not within the line-of-sight of a sensor, radar, or camera. Furthermore, if there are multiple vehicles within the vicinity, then the sensor, radar, or camera may only be able to detect incidents that occur within the line-of-sight or within an immediate distance of the autonomous vehicle.

SUMMARY

In one example, a broadcasting system for an autonomous vehicle is disclosed and includes an antenna, a plurality of sensors, one or more processors, and a memory coupled to the processors. The antenna is configured to send and receive wireless communication, and the antenna receives publically available wireless signals. The sensors are configured to generate signals indicating a real-time velocity and a real-time direction of travel of the autonomous vehicle. The processors are in communication with the antenna and the plurality of sensors. The memory stores data comprising program code that, when executed by the one or more processors, causes the system to receive as input the publically available wireless signals and the signals indicating the real-time velocity and the real-time direction of travel of the autonomous vehicle. The system is further caused to determine a real-time velocity and real-time direction of travel of autonomous vehicle. The system is further caused to determine the real-time velocity and the real-time direction of travel of autonomous vehicle based on the signals generated by the plurality of sensors. The system is also caused to determine a real-time position of the autonomous vehicle based on the publically available wireless signals. Finally, the system is caused to transmit, by the antenna, radio frequency (RF) signals indicating the real-time position, the real-time velocity, and the real-time direction of travel of the autonomous vehicle.

In another example, an autonomous vehicle including a broadcasting system is disclosed, where a vehicle is positioned within proximity of the autonomous vehicle. The broadcasting system comprises an antenna, a plurality of sensors, one or more processors, and a memory coupled to the one or more processors. The antenna is configured to send and receive wireless communication, and the antenna receives publically available wireless signals. The sensors are configured to generate signals indicating a real-time velocity and direction of travel of the autonomous vehicle. The processors are in communication with the antenna and the plurality of sensors. The memory stores data comprising program code that, when executed by the one or more processors, causes the broadcasting system to receive as input the publically available wireless signals, the signals generated by the sensors, and asynchronous RF signals generated by the vehicle. Each asynchronous RF signal indicates a specific real-time position, a specific real-time velocity, and a specific real-time direction of travel of the vehicle. The system is further caused to determine a real-time velocity and real-time direction of travel of the autonomous vehicle based on the signals generated by the sensors. The system is also caused to determine a real-time position of the autonomous vehicle based on the publically available wireless signals. Finally, the system is caused to generate a vector diagram that estimates a first forecast vector $V_1'$ at a specific point in time in an immediate future based on the real-time velocity and the real-time direction of travel of the autonomous vehicle and a second forecast vector $V_2'$ at the specific point in time in the immediate future based on the real-time velocity and the real-time direction of travel of the vehicle.

In another example, a method of determining a potential collision involving an autonomous vehicle and a vehicle positioned within proximity of the autonomous vehicle is disclosed. The method comprises receiving, by an antenna, asynchronous RF signals generated by the vehicle. The asynchronous RF signals indicate a specific real-time position, a specific real-time velocity, and a specific real-time direction of travel of the vehicle. The method also includes determining, by a computer, a status of the asynchronous RF signals generated by the vehicle. The status indicates a presence of prior messages generated by the vehicle that are saved in memory of the computer. In response to determining the presence of prior messages in the memory of the computer, the method includes determining, by the computer, a vector diagram including a first forecast vector $V_1'$ corresponding to the autonomous vehicle and a second forecast vector $V_2'$. Finally, the method includes estimating an occurrence of a possible intersection between the first forecast vector $V_1'$ and the second forecast vector $V_2'$, where the possible intersection represents the potential collision.

Other objects and advantages of the disclosed method and system will be apparent from the following description, the accompanying drawings and the appended claims.

DETAILED DESCRIPTION

Figure 1:
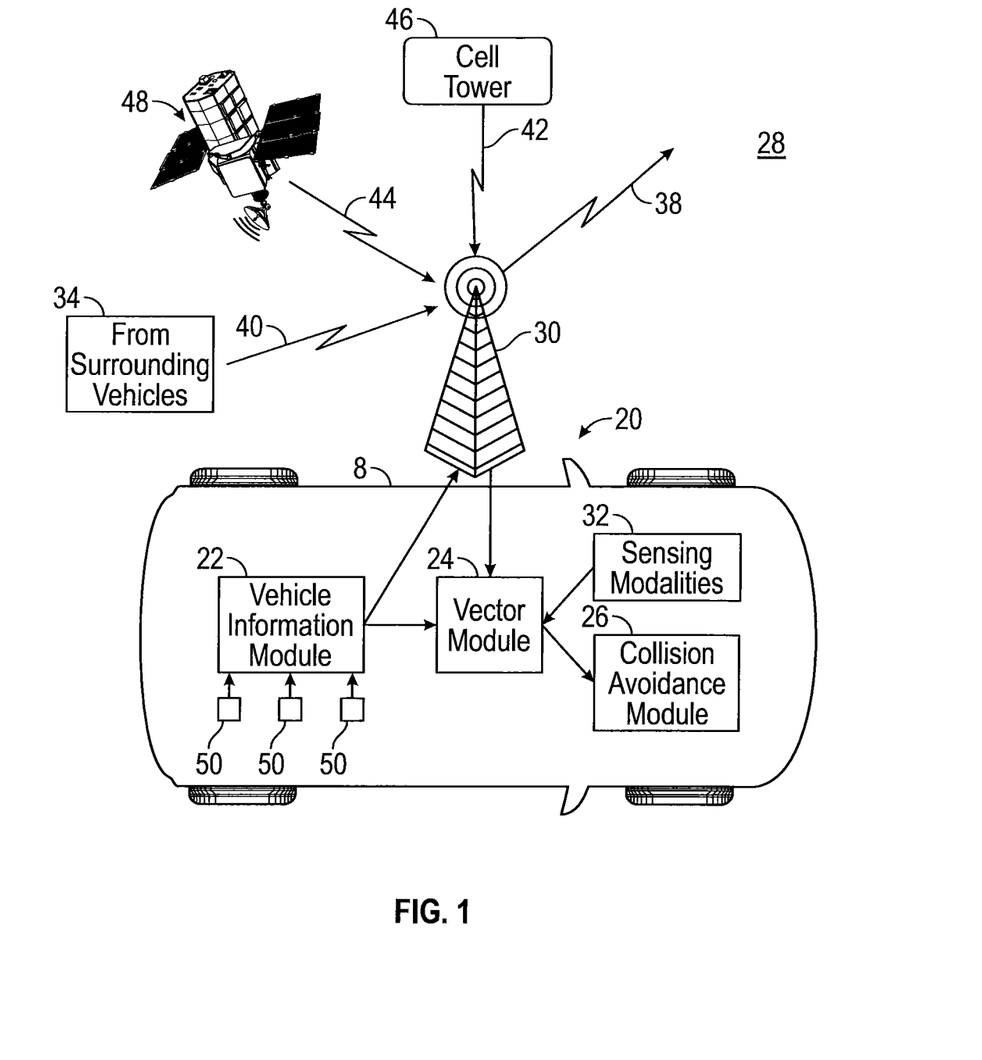
FIG. 1 is an exemplary schematic block diagram of an autonomous vehicle including the disclosed broadcasting system.

FIG. 1 is an exemplary schematic block diagram of an autonomous vehicle 8 including a broadcasting system 20. In one embodiment the autonomous vehicle 8 navigates a roadway, airspace, or other environment with limited or no input from a driver. However, the autonomous vehicle 8 also includes vehicles that include limited autonomous features as well. The broadcasting system 20 communicates real-time movement of the autonomous vehicle 8 to an environment 28 using wireless signals. The broadcasting system 20 also receives broadcasts from one or more vehicles 34 (seen in FIG. 2) that are equipped with a similar broadcasting system 20, where the wireless signals indicate the real-time movement of a particular vehicle. The broadcasting system 20 includes a vehicle information module 22, a vector module 24, a collision avoidance module 26, a transceiver antenna 30, and a plurality of sensing modalities 32 to detect obstacles in an operating environment 28. The sensing modalities 32 are configured to detect the presence of objects unable to transmit wireless signals indicating their respective real-time movements. Some examples of sensing modalities 32 include video cameras, thermal cameras, ultrasonic devices, and radar devices such as Light/Laser Detection and Ranging (LiDAR).

In the exemplary embodiment as shown in FIG. 1, the modules 22, 24, and 26 are shown as distinct components, which may indicate the use of modular programming techniques. However, the software design may decrease the extent to which the modules 22, 24, and 26 are distinct by combining at least some program functions of multiple modules into a single module. Moreover, those of ordinary skill in the art will appreciate that the functions attributed to the modules 22, 24, and 26 may be distributed in other ways, or on other systems than those depicted. Thus, the disclosure is not limited to the specific arrangement of systems or modules shown in FIG. 1.

The autonomous vehicle 8 includes semi-autonomous vehicles that require driver input for some or even most maneuvers, but also include at least one feature that allows for the vehicle to operate autonomously in specific conditions. For example, vehicles that include automated systems for braking, steering, acceleration, or parking are also included within the scope of this disclosure. Accordingly, the autonomous vehicle 8 is not limited to vehicles that operate with little or no input from a driver. Moreover, although the figures illustrate the autonomous vehicle 8 as an automobile, and in particular as a passenger car, this illustration is exemplary in nature. Indeed, the autonomous vehicle 8 may be any type of vehicle for navigating land, bodies of water, or airspace. For example, in one embodiment the autonomous vehicle 8 may be any other type of land vehicle such a truck, a motorized bicycle, or industrial vehicles such as forklifts that are used to navigate a factory floor. Furthermore, the disclosure is not limited to land vehicles. In another embodiment, the autonomous vehicle 8 may be a vehicle that travels in air such as, for example, an unmanned aerial vehicle (UAV) or an aircraft that is operated during ground control. In yet another embodiment, the autonomous vehicle 8 may travel in a body of water such as an ocean, lake, or river. For example, the autonomous vehicle 8 may also be a motorized boat.

Figure 2:
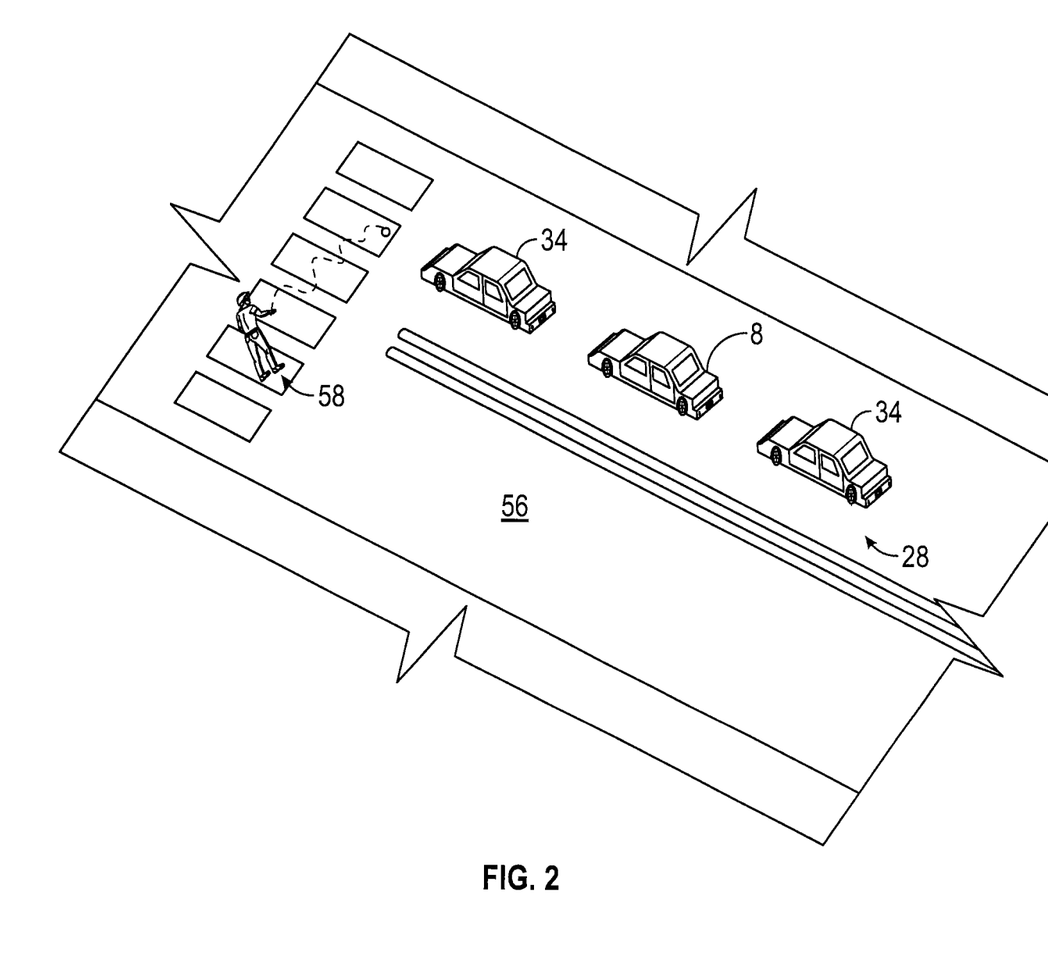
FIG. 2 is an exemplary environment illustrating the autonomous vehicle and another vehicle.

FIG. 2 is an illustration of the operating environment 28. The operating environment 28 may include one or more vehicles 34 and/or other obstacles 58 that surround the autonomous vehicle 8. For example, in the embodiment as shown in FIG. 2 the obstacle 58 is a pedestrian. Other obstacles 58 within the operating environment may include, for example, pedestrians, bicycles, or even animals such as dogs or horses that cross a roadway 56. In another embodiment where the autonomous vehicle 8 is an aircraft, the obstacles 58 may include other aircraft and buildings. Although FIG. 2 also illustrates a single vehicle 34 that is equipped with a similar broadcasting system 20, multiple vehicles 34 may be situated in the operating environment 28 as well.

Referring to both FIGS. 1 and 2, in one embodiment some vehicles within the operating environment 28 may not be equipped with a corresponding broadcasting system 20. Specifically, some older vehicles may not be equipped with a broadcasting system 20. For example, classic automobiles may not equipped with the disclosed broadcasting system 20. As explained below, the presence of a particular vehicle 34 is determined by the broadcasting system 20 of the autonomous vehicle 8 based on wireless signals that are transmitted by the broadcasting system 20 of the particular vehicle 34. However, the presence of a vehicle that does not include the disclosed broadcasting system 20 is determined using the sensing modalities 32. For example, the broadcasting system 20 may detect the presence of a vehicle without a broadcasting system 20 by video camera or radar. The sensing modalities 32 determine a position, velocity, and direction of travel of a particular vehicle as well. For example, LiDAR may be used to determine the velocity of a particular vehicle 34.

Turning back to FIG. 1, the antenna 30 is an omni-directional antenna configured to send and receive wireless communication such as radio frequency (RF) signals. The antenna 30 transmits information relating to the autonomous vehicle 8 by RF signals 38. The RF signals 38 indicate a specific position in relation to Earth, the speed or velocity, and a direction of travel of the autonomous vehicle 8. As explained in greater detail below, the specific position of the autonomous vehicle 8 is determined based on publically available wireless signals. One example of a publically available wireless signal is a global positioning system (GPS) signal 44.

The velocity and direction of travel of the autonomous vehicle 8 are determined based on signals detected by a plurality of sensors 50 in communication with the vehicle information module 22. The sensors 50 are configured to generate signals indicating a real-time velocity and a real-time direction of travel of the autonomous vehicle 8. The vehicle information module 22 determines the real-time velocity and direction of travel of autonomous vehicle 8 based on the signals detected by the sensors 50. For example, in one embodiment the sensors 50 may include an accelerometer that generates signals indicating the velocity and a gyroscope that generates signals indicating the direction of travel of the autonomous vehicle 8.

The RF signals 38 are transmitted by the antenna 30 at timed intervals. In one embodiment, the timed intervals are based on a default setting. Alternatively, in another embodiment the timed intervals are adjusted based on current traffic conditions and operating conditions of the autonomous vehicle 8. However, the timed intervals include a maximum value, where the antenna 30 does not transmit the RF signals 38 at a timed interval greater than the maximum value, which prevents the presence of excessive periods of time where no information is transmitted.

In one embodiment, the timed intervals range from about 0.1 second to about 0.5 seconds, where the timed intervals are adjusted based on the real-time velocity of the autonomous vehicle 8 as well as the presence of obstacles within the reaction distance of the autonomous vehicle 8 vehicle. The reaction distance represents a distance traveled in the time it takes for a driver to react to a hazard and apply brakes. For example, the timed intervals tend to increase and become longer in time when the velocity of the autonomous vehicle 8 is decreased or when obstacles are located further away.

Referring now to FIGS. 1 and 2, the antenna 30 also receives asynchronous RF signals 40 generated by at least one other vehicle 34 in the operating environment 28 (FIG. 2), where the vehicle 34 is positioned within proximity of the autonomous vehicle 8. Specifically, a specific vehicle 34 or other obstacle 58 (e.g., the pedestrian in FIG. 2) is considered to be within proximity of the autonomous vehicle 8 when the specific vehicle 34 or obstacle 58 is located at a distance that is at least about twice the standard braking distance of the autonomous vehicle 8. For example, in one embodiment a specific vehicle 34 is considered to be within proximity to the autonomous vehicle 8 when the vehicle 34 is located at a distance in front of the autonomous vehicle 8, where the distance is about two to three times the standard braking distance of the autonomous vehicle 8.

In addition to distances in front of the autonomous vehicle 8, the distance is also measured along any line of travel of the autonomous vehicle 8 as well. Accordingly, the distance includes all vehicles 34 and obstacles that require potential avoidance action by the autonomous vehicle 8, while at the same time not including an excessive number of vehicles and obstacles that are superfluous.

Each asynchronous RF signal 40 indicates a specific real-time position, a specific real-time velocity, and a specific real-time direction of travel of a specific vehicle 34 located within the proximity of the autonomous vehicle 8. As explained below, the specific real-time position, the specific real-time velocity, and the specific real-time direction of travel are used to determine a position of each specific vehicle 34 at a known time occurring in the immediate future. For purposes of this disclosure, the immediate future is measured in seconds and is based on the reaction time of the autonomous vehicle 8. The reaction time is representative of the time it takes for the driver to react to a hazard and apply brakes. The RF signals 40 are encrypted or include other security measures to ensure that the RF signals 40 are not used for unwanted or unauthorized purposes.

In addition to the RF signal 40, the antenna 30 also receives wireless signals that indicate publicly accessible information and are referred to as public signals or publically available wireless signals. Some examples of publically available wireless signals include, but are not limited to, cellular signals 42 generated by a cell tower 46 and the GPS signals 44 generated by a plurality of GPS satellites 48. The publicly assessable information is used to determine the specific location of the autonomous vehicle 8 in relation to Earth. Specifically, the vehicle information module 22 receives a GPS signal 44 from each GPS satellite 48. Each GPS signal 44 indicates the time and location at which the GPS signal 44 was sent. The vehicle information module 22 determines the specific location of the autonomous vehicle 8 in relation to Earth based on a trilateration process. Also, the relative signal strength of the cellular signals 42 at the cellular towers 46 may be used to triangulate and estimate position of a cellular sender. The coverage areas of GPS and cellular networks tend to complement one another. Accordingly, when both information sources are available, similar information elements are compared, such as when both have clock information or when position may be measured by GPS and also by cellular signal strength triangulation, with GPS given priority. However, an accelerometer coupled to a clock may also be used to update position in the event the GPS signals 44 are unavailable. Changes in cellular signal strength as identified by the cell towers 46 also provide input as to location or change of location.

Referring to both FIGS. 1 and 2, the RF signals 38 transmitted by the antenna 30 further include the specific real-time position, the specific real-time velocity, and the specific real-time direction of travel of one or more vehicles 34 located within proximity of the autonomous vehicle 8. However, the RF signals 38 are flagged to indicate that the information relating to the surrounding vehicles 34 has been rebroadcasted by the autonomous vehicle 8 so as to avoid confusion regarding time and location correction factors.

The information relating to the autonomous vehicle 8 is updated based on timed update intervals, where the intervals are based on the specific source of information. Specifically, the publically available wireless signals such as the cellular signals 42 the GPS signals 44, the real-time velocity, and the real-time direction of the autonomous vehicle 8 are monitored and updated based on different time intervals. Specifically, the cellular signals 42 are received at intervals established by a standard cellular communication network. The GPS signals 44 are received at update intervals of about 0.5 seconds, or 2 Hertz. The update intervals relating to the velocity and direction of the autonomous vehicle 8 are determined based on velocity and the number of other vehicles being monitored. The vehicle information module 22 also includes a clock (not illustrated). The vehicle information module 22 receives and processes the information related to the autonomous vehicle 8, and correlates the information obtained from the cellular signals 42, the GPS signals 44, and the sensors 50 together. The local clock (not illustrated) of the vehicle information module 22 is then updated so as to be synchronized with time information received from external sources (i.e., the GPS signals 44 and/or cellular signals 42).

Referring to both FIGS. 1 and 2, the broadcasting system 20 evaluates the potential interactions between the autonomous vehicle 8 and obstacles that are within proximity of the autonomous vehicle 8. The obstacles include the surrounding vehicles 34 as well as other objects that do not emit a broadcast signal such as the pedestrian shown in FIG. 2. The broadcasting system 20 then determines at least one vehicle control action that is taken in response to the potential interactions of the vehicles 34. The vehicle control action represents one or more maneuvers executed by the autonomous vehicle 8 to avoid a potential collision.

In one embodiment, the vehicle control action is any type of maneuver such as, but not limited to, braking, accelerating, swerving, changing lanes, and turning. Maneuvers may also include non-movements or no action that is taken by the autonomous vehicle 8 as well. For example, the broadcasting system 20 may decide to instruct the autonomous vehicle 8 to stay stationary based on the actions of the surrounding vehicles 34. In still another embodiment, the vehicle control action is simply to keep the autonomous vehicle 8 travelling at the same direction and velocity. The vehicle control action is used for collision avoidance, operation of the autonomous vehicle 8, and for coordinating traffic in relation to the other vehicles 34.

Turning back to FIG. 1, the vector module 24 receives as input one or more asynchronous RF signals 40 from the other vehicles 34 in the operating environment 28 (FIG. 2), the real-time location, real-time velocity, and real-time direction of travel of the autonomous vehicle 8 from the vehicle information module 22, and the position of other obstacles that are within proximity to the autonomous vehicle 8, but do not emit a broadcast signal from the sensing modality 32. As explained above, the obstacles include any object unable to broadcast information wirelessly such as older vehicles not equipped with a broadcasting system or the pedestrian shown in FIG. 2.

Figure 3:
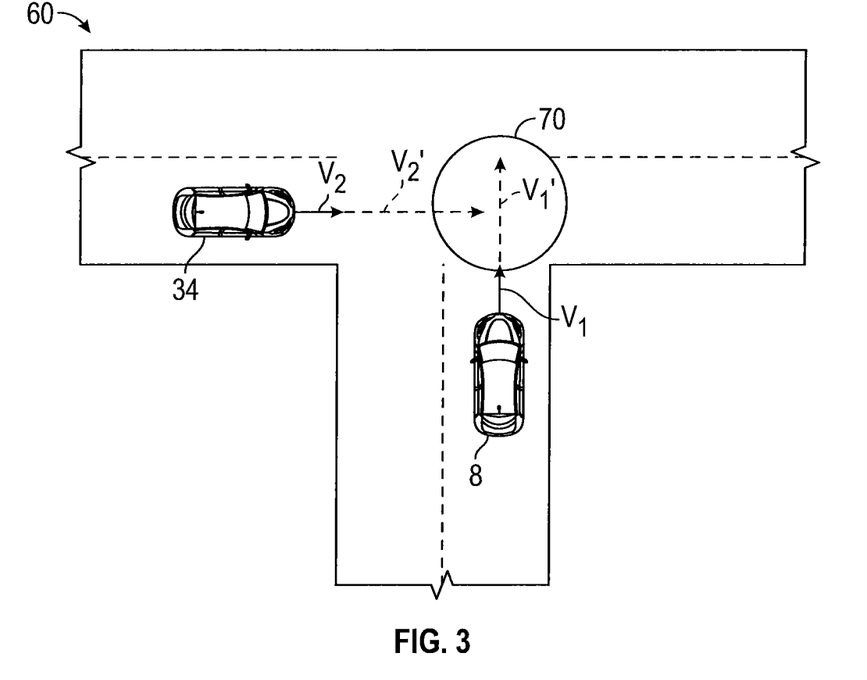
FIG. 3 is a vector diagram determined by the broadcasting system shown in FIG. 1, where the vector diagram is used to predict a collision between the autonomous vehicle and another vehicle.

The vector module 24 generates a vector diagram based on the inputs, where the vector diagram determines a position of the autonomous vehicle 8 in relation to potential obstructions located within proximity. FIG. 3 illustrates an exemplary vector diagram 60 generated by the vector module 24. The vector diagram 60 indicates a position of the autonomous vehicle 8 and a position of the vehicle 34, which is within proximity to the autonomous vehicle 8. The vector diagram 60 includes a first position vector $V_1$ indicating the immediate path of travel of the autonomous vehicle 8. The vector diagram 60 also includes a second position vector $V_2$ indicating the immediate path of travel of the other vehicle 34. Additionally, the vector diagram 60 also includes a first forecast vector $V_1'$ that predicts the trajectory and position of the autonomous vehicle 8, and a second forecast vector $V_2'$ that predicts the trajectory and position of the other vehicle 34.

It is to be appreciated that FIG. 3 only includes one other vehicle 34 in the vector diagram 60 for purposes of clarity and ease of explanation, and is merely one example of a possible vector diagram 60. Accordingly, the vector diagram 60 may include additional vehicles 34 as well. The vector diagram 60 may also include other obstacles such as pedestrians or animals within proximity of the autonomous vehicle 8.

Referring to both FIGS. 1 and 3, the vector module 24 integrates the velocity of a specific object (i.e., the surrounding vehicles 34) to obtain a corresponding position vector. Specifically, the vector module 24 integrates the velocity of the autonomous vehicle 8 to determine the first position vector $V_1$ and the velocity of the surrounding vehicle 34 to determine the second position vector $V_2$. The vector module 24 then estimates the first forecast vector $V_1'$ at a specific point in time in the immediate future based on the real-time velocity and the real-time direction of travel of the autonomous vehicle 8. Similarly, the vector module 24 determines the second forecast vector $V_2'$ at the specific point in time in the immediate future based on the real-time velocity and the real-time direction of travel of the other vehicle 34.

Once the vector diagram 60 is generated, the vector module 24 estimates a possible intersection between the first forecast vector $V_1'$ and the second forecast vector $V_2'$, where the possible intersection represents a potential collision between the autonomous vehicle 8 and the vehicle 34. The possible intersection 70 is created by extending the first forecast vector $V_1'$ representing the trajectory and position of the autonomous vehicle 8 and the second forecast vector $V_2'$ representing the trajectory and position of the other vehicle 34. However, if the two forecast vectors $V_1'$ and $V_2'$ do not intersect one another, then no collision occurs between the vehicles 8, 34. In the embodiment as shown in FIG. 3, the trajectory of the forecast vectors $V_1'$, $V_2'$ intersect to create the possible intersection 70.

Figure 4:
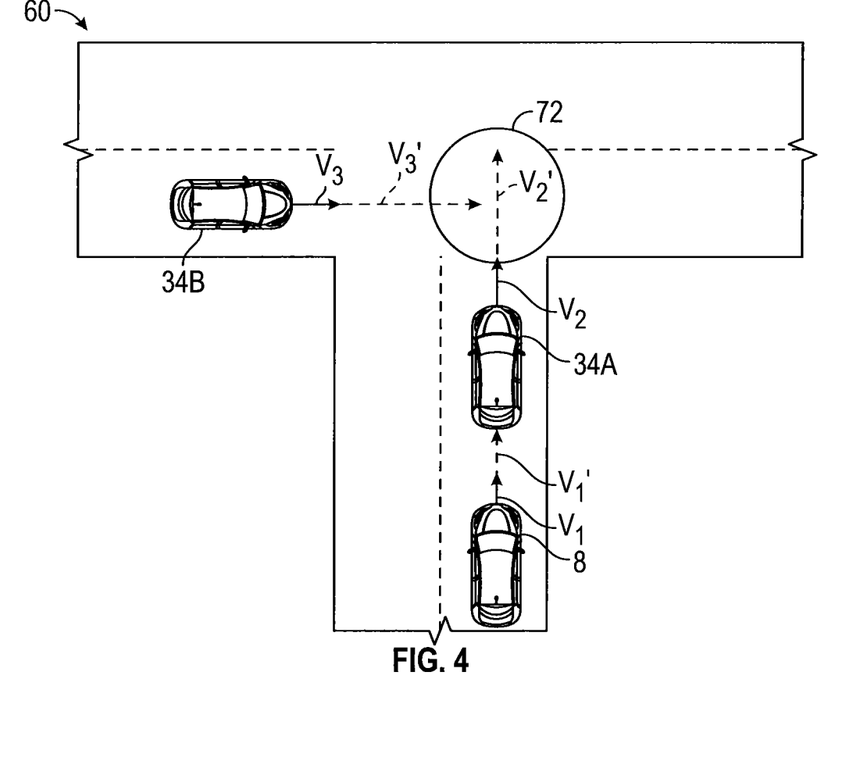
FIG. 4 is a vector diagram determined by the broadcasting system shown in FIG. 1, where the vector diagram is used to predict a collision involving two other vehicles that creates a chain reaction that results in the autonomous vehicle also colliding with the other vehicles.

In one embodiment, the vector module 24 also determines potential peripheral collisions between other obstructions that are within proximity of the autonomous vehicle 8, where the peripheral collisions intersect with the forecast vector $V_1'$ of the autonomous vehicle 8. Turning now to FIG. 4, an alternative embodiment of the vector diagram 60 is illustrated. The vector diagram 60 includes two vehicles 34A and 34B within proximity of the autonomous vehicle 8. Referring to both FIGS. 1 and 4, the vector module 24 determines a potential peripheral intersection 72 between the two surrounding vehicles 34A, 34B. The potential peripheral intersection 72 creates a chain reaction that results in the autonomous vehicle 8 colliding with one or more of the surrounding vehicles 34A, 34B.

The vector diagram 60 includes the first forecast vector $V_1'$ representing the trajectory and position of the autonomous vehicle 8, the second position vector $V_2$ indicating the immediate path of travel of the surrounding vehicle 34A, and a third position vector $V_3$ indicating the immediate path of travel of the surrounding vehicle 34B. Additionally, the vector diagram 60 also includes a second forecast vector $V_2'$ that predicts the trajectory and position of the surrounding vehicle 34A, and a third forecast vector $V_3'$ that predicts the trajectory and position of the surrounding vehicle 34B.

The potential peripheral intersection 72 is estimated by extending the second forecast vector $V_2'$ representing the trajectory and position of the vehicle 34A and the third forecast vector $V_3'$ representing the trajectory and position of the vehicle 34B, and determining the second forecast vector $V_2'$ and the third forecast vector $V_3'$ intersect with one another. As seen in FIG. 4, the first forecast vector $V_1'$ representing the trajectory and position of the autonomous vehicle 8 intersects with the potential peripheral intersection 72 between the two surrounding vehicles 34. The intersection between the first forecast vector $V_1'$ and the potential peripheral intersection 72 represents another potential secondary collision that occurs between the two surrounding vehicles 34 and the autonomous vehicle 8.

Turning back to FIG. 1, the vector module 24 sends a notification to the collision avoidance module 26 in response to determining a collision involving the autonomous vehicle 8. Specifically, in response to determining either a potential collision as seen in FIG. 3 or a potential secondary collision as seen in FIG. 4, the vector module 24 sends the notification to the collision avoidance module 26 indicating a collision is about to occur. The notification also includes details of the collision as well such a distance between the autonomous vehicle 8 and the potential collision and the specific location of the collision relative to Earth. In response to receiving the notification of a potential collision, the collision avoidance module 26 then determine at least one vehicle control action to be executed by the autonomous vehicle 8 to avoid the potential collision.

Referring to FIGS. 1 and 2, the vector module 24 maintains and updates information pertaining to each vehicle 34 within proximity of the autonomous vehicle 8 as long as a potential collision or other interaction is capable of occurring between the autonomous vehicle 8 and an individual vehicle 34. Once the vector module 24 determines that no potential collision may occur between the autonomous vehicle 8 and another obstacle, then the obstacle is flagged for removal from the vector diagram 60 (FIGS. 3 and 4).

Figure 5:
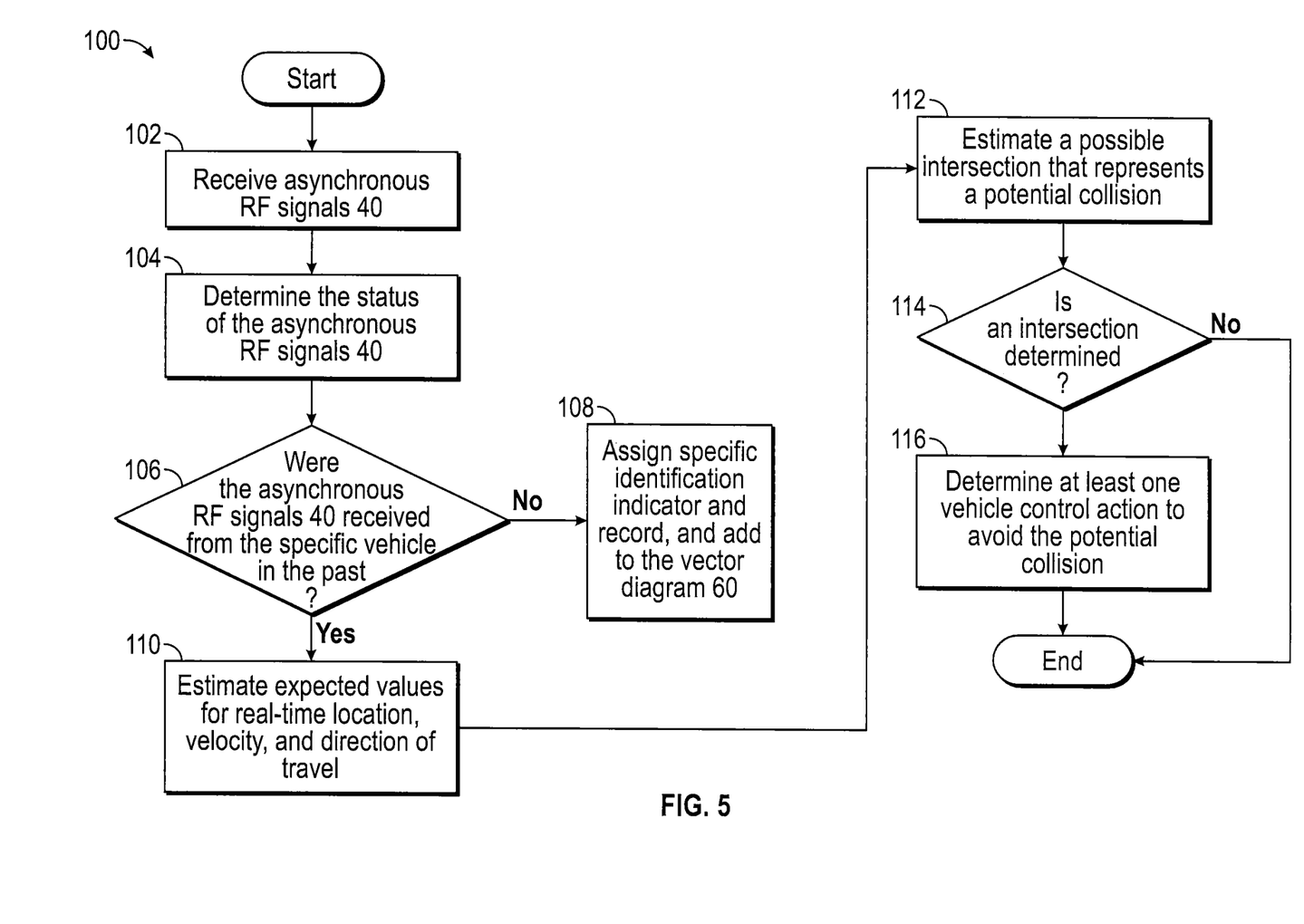
FIG. 5 is an exemplary process flow diagram illustrating a method for operating the disclosed broadcasting system shown in FIG. 1.

FIG. 5 is an exemplary process flow diagram illustrating one method 100 for determining a potential collision involving the autonomous vehicle 8 and a specific vehicle 34 that transmits asynchronous RF signals 40. Referring generally to FIGS. 1-5, the method begins at block 102. In block 102, the antenna 30 receives asynchronous RF signals 40 generated by a specific vehicle 34 in the operating environment 28 (FIG. 2). As mentioned above, the RF signal 40 indicates a specific real-time position, a specific real-time velocity, and a specific real-time direction of travel of a specific vehicle 34. The method 100 may then proceed to block 104.

In block 104, the vector module 24 determines the status of the asynchronous RF signals 40 generated by the specific vehicle 34 in block 102. Specifically, the status indicates the presence of prior messages generated by the specific vehicle 34 saved in memory of the vector module 24. The method 100 may then proceed to decision block 106. Decision block 106 determines if asynchronous RF signals 40 originating from a specific vehicle were received by the vector module 24 in the past. In response to the vector module 24 determining an absence of the prior message from a specific vehicle, method 100 then proceeds to block 108. In block 108, the vector module 24 assigns a specific identification indicator and record that corresponds to the specific vehicle 34. The vector module 24 also adds the record corresponding to the specific vehicle 34 to the vector diagram 60. The method 100 may then proceed to block 112.

Referring back to the decision block 106, in response to determining the presence of a prior message in the memory of the vector module 24, the method 100 then proceeds to block 110. In block 110, the vector module 24 estimates expected values for the real-time specific location, the specific real-time velocity, and the specific real-time direction of the vehicle 34 based on the last data point that was received. The vector module 24 then compares the estimated values with the actual values that are indicated by the RF signal 40, and then performs corrections if the comparison indicates that the actual values for the real-time specific location, the specific real-time velocity, and the specific real-time direction of the vehicle 34 fall outside of an acceptable error margin. The vector module 24 then updates the vector diagram 60 with either the actual values or a set of corrected values indicating the real-time specific location, the specific real-time velocity, and the specific real-time direction of the vehicle 34. The method 100 may then proceed to block 112.

In block 112, the vector module 24 estimates an occurrence of a possible intersection between the forecast vector $V_1'$ corresponding to the autonomous vehicle 8 and the second forecast vector $V_2'$ corresponding to the specific vehicle 34 (FIG. 3). The possible intersection represents a potential collision between the autonomous vehicle 8 and the vehicle 34. The method 100 may then proceed to decision block 114. In decision block 114, if no intersection is estimated, then the method 100 terminates. However, if the vector module 24 estimates an occurrence of a possible intersection, then the method 100 proceeds to block 116.

In block 116, the collision avoidance module 26 determines at least one vehicle control action to be executed by the autonomous vehicle 8 to avoid the potential collision. As mentioned above, the vehicle control action represents one or more maneuvers executed by the autonomous vehicle 8 to avoid a potential collision such as, but not limited to, braking, accelerating, swerving, changing lanes, and turning. The method 100 may then terminate.

Referring generally to FIGS. 1-5, the disclosed broadcasting system provides an autonomous vehicle with the ability to communicate real-time movement to other vehicles equipped with a similar broadcasting system. The broadcasting system also receives wireless communication from other vehicles within proximity, and evaluates the broadcasts to determine the presence of a potential collision that involves the autonomous vehicle. Accordingly, unlike conventional autonomous vehicles, the disclosed broadcasting systems allows for the autonomous vehicle to determine driving patterns based on information that is not necessarily within the line-of-sight of the autonomous vehicle. Moreover, the disclosed broadcasting system also enables the autonomous vehicle to determine control based on objective information communicated by the broadcast messages from other vehicles. In contrast, conventional vehicles may rely upon information detected by sensors such as camera and radars that may be error-prone and determined based on subjective measures.

Figure 6:
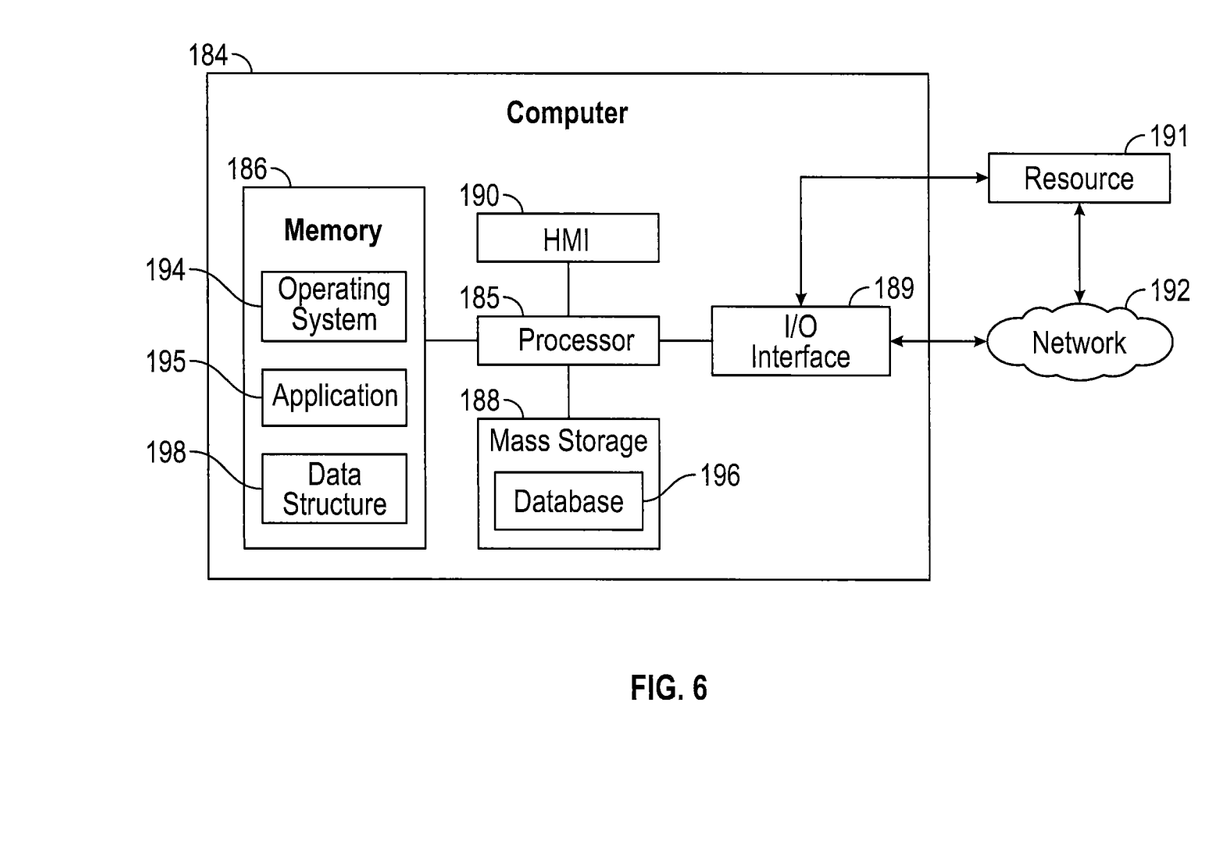
FIG. 6 is a diagrammatic view of an exemplary computer system of FIG. 1.

Referring now to FIG. 6, the modules 22, 24, and 26 in FIG. 1 are implemented on one or more computer devices or systems, such as exemplary computer system 184. The computer system 184 includes a processor 185, a memory 186, a mass storage memory device 188, an input/output (I/O) interface 189, and a Human Machine Interface (HMI) 190. The computer system 184 is operatively coupled to one or more external resources 191 via a network 192 or I/O interface 189. External resources may include, but are not limited to, servers, databases, mass storage devices, peripheral devices, cloud-based network services, or any other suitable computer resource that may be used by the computer system 184.

The processor 185 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 186. Memory 186 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 88 includes data storage devices such as a hard drive, optical drive, tape drive, volatile or non-volatile solid state device, or any other device capable of storing information.

The processor 185 operates under the control of an operating system 194 that resides in memory 186. The operating system 194 manages computer resources so that computer program code embodied as one or more computer software applications, such as an application 195 residing in memory 186, has instructions executed by the processor 185. In an alternative embodiment, the processor 185 executes the application 195 directly, in which case the operating system 194 may be omitted. One or more data structures 198 may also reside in memory 186, and may be used by the processor 185, operating system 194, or application 195 to store or manipulate data.

The I/O interface 189 provides a machine interface that operatively couples the processor 185 to other devices and systems, such as the network 192 or external resource 191. The application 195 thereby works cooperatively with the network 192 or external resource 191 by communicating via the I/O interface 189 to provide the various features, functions, applications, processes, or modules comprising embodiments of the invention. The application 195 has program code that is executed by one or more external resources 191, or otherwise rely on functions or signals provided by other system or network components external to the computer system 184. Indeed, given the nearly endless hardware and software configurations possible, persons having ordinary skill in the art will understand that embodiments of the invention may include applications that are located externally to the computer system 184, distributed among multiple computers or other external resources 191, or provided by computing resources (hardware and software) that are provided as a service over the network 192, such as a cloud computing service.

The HMI 190 is operatively coupled to the processor 185 of computer system 184 in a known manner to allow a user to interact directly with the computer system 184. The HMI 190 may include video or alphanumeric displays, a touch screen, a speaker, and any other suitable audio and visual indicators capable of providing data to the user. The HMI 190 may also include input devices and controls such as an alphanumeric keyboard, a pointing device, keypads, push-buttons, control knobs, microphones, etc., capable of accepting commands or input from the user and transmitting the entered input to the processor 185.

A database 196 resides on the mass storage memory device 188, and may be used to collect and organize data used by the various systems and modules described herein. The database 196 may include data and supporting data structures that store and organize the data. In particular, the database 196 may be arranged with any database organization or structure including, but not limited to, a relational database, a hierarchical database, a network database, or combinations thereof. A database management system in the form of a computer software application executing as instructions on the processor 185 may be used to access the information or data stored in records of the database 196 in response to a query, where a query may be dynamically determined and executed by the operating system 194, other applications 195, or one or more modules.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A broadcasting system for an autonomous vehicle, comprising:

an antenna configured to send and receive wireless communication, wherein the antenna receives publically available wireless signals;

a plurality of sensors configured to generate signals indicating a real-time velocity and a real-time direction of travel of the autonomous vehicle;

one or more processors in communication with the antenna and the plurality of sensors; and a memory coupled to the one or more processors, the memory storing data comprising program code that, when executed by the one or more processors, causes the broadcasting system to:

receive as input the publically available wireless signals and the signals indicating the real-time velocity and the real-time direction of travel of the autonomous vehicle, and asynchronous radio frequency (RF) signals generated by a vehicle positioned in proximity of the autonomous vehicle, and wherein each asynchronous RF signal indicates a specific real-time position, a specific real-time velocity, and a specific real-time direction of travel of the vehicle;

determine the real-time velocity and the real-time direction of travel of the autonomous vehicle based on the signals generated by the plurality of sensors;

determine a real-time position of the autonomous vehicle based on the publically available wireless signals;

transmit, by the antenna, radio frequency (RF) signals indicating the real-time position, the real-time velocity, and the real-time direction of travel of the autonomous vehicle;

generate a vector diagram that estimates a first forecast vector at a specific point in time in an immediate future based on the real-time velocity and the real-time direction of travel of the autonomous vehicle and a second forecast vector at the specific point in time in the immediate future based on the real-time velocity and the real-time direction of travel of the vehicle; and determine at least one vehicle control action to be executed by the autonomous vehicle to avoid a potential collision between the autonomous vehicle and the vehicle in response to a possible intersection of the first forecast vector and the second forecast vector, wherein the at least one vehicle control action comprises swerving, changing lanes or turning to avoid the potential collision.

2. The broadcasting system of claim 1, wherein the RF signals are transmitted by the antenna at timed intervals.

3. The broadcasting system of claim 2, wherein the timed intervals are adjusted based on the real-time velocity of the autonomous vehicle and a presence of obstacles within a reaction distance of the autonomous vehicle.

4. The broadcasting system of claim 2, wherein the timed intervals range from about 0.1 second to about 0.5 seconds.

5. The broadcasting system of claim 1, wherein the antenna receives the asynchronous RF signals generated by the vehicle positioned in proximity of the autonomous vehicle, and wherein each asynchronous RF signal indicates the specific real-time position, the specific real-time velocity, and the specific real-time direction of travel of the vehicle.

6. The broadcasting system of claim 5, wherein the vehicle is within proximity of the autonomous vehicle when the vehicle is located at a distance at least about twice a standard braking distance of the autonomous vehicle.

7. The broadcasting system of claim 5, wherein the RF signals transmitted by the antenna further include the specific real-time position, the specific real-time velocity, and the specific real-time direction of travel of the vehicle located within proximity of the autonomous vehicle.

8. The broadcasting system of claim 1, wherein the publically available wireless signals are global positioning (GPS) signals.

9. The broadcasting system of claim 1, comprising a plurality of sensing modalities in communication with the one or more processors and configured to detect objects unable to transmit wireless signals.

10. An autonomous vehicle including a broadcasting system, wherein a vehicle is positioned within proximity of the autonomous vehicle, the broadcasting system comprising:
an antenna configured to send and receive wireless communication, wherein the antenna receives publically available wireless signals;
a plurality of sensors configured to generate signals indicating a real-time velocity and direction of travel of the autonomous vehicle;
one or more processors in communication with the antenna and the plurality of sensors; and
a memory coupled to the one or more processors, the memory storing data comprising program code that, when executed by the one or more processors, causes the broadcasting system to:
receive as input the publically available wireless signals, the signals generated by the sensors, and asynchronous RF signals generated by the vehicle, wherein each asynchronous RF signal indicates a specific real-time position, a specific real-time velocity, and a specific real-time direction of travel of the vehicle;
determine a real-time velocity and real-time direction of travel of the autonomous vehicle based on the signals generated by the sensors;
determine a real-time position of the autonomous vehicle based on the publically available wireless signals;
generate a vector diagram that estimates a first forecast vector at a specific point in time in an immediate future based on the real-time velocity and the real-time direction of travel of the autonomous vehicle and a second forecast vector at the specific point in time in the immediate future based on the real-time velocity and the real-time direction of travel of the vehicle; and
determine at least one vehicle control action to be executed by the autonomous vehicle to avoid a potential collision between the autonomous vehicle and the vehicle in response to a possible intersection of the first forecast vector and the second forecast vector, wherein the at least one vehicle control action comprises swerving, changing lanes or turning to avoid the potential collision.

11. The autonomous vehicle of claim 10, wherein the program code, when executed by the one or more processors, further causes the broadcasting system to:
estimate the possible intersection between the first forecast vector and the second forecast vector, wherein the possible intersection represents the potential collision between the autonomous vehicle and the vehicle.

12. The autonomous vehicle of claim 11, wherein the vehicle control action represents one or more maneuvers executed by the autonomous vehicle to avoid the potential collision.

13. The autonomous vehicle of claim 10, wherein a third vehicle is within proximity of the autonomous vehicle and the program code, when executed by the one or more processors, further causes the broadcasting system to:
estimate a third forecast vector at the specific point in time in the immediate future for the vector diagram, wherein the third forecast vector is based on a third real-time velocity and a third real-time direction of travel of the third vehicle.

14. The autonomous vehicle of claim 13, wherein the program code, when executed by the one or more processors, further causes the broadcasting system to:
extend the second forecast vector representing a trajectory and a position of the vehicle and the forecast vector representing a trajectory and a position of the vehicle; and
estimate a potential peripheral intersection by determining the forecast vector and the third forecast vector intersect with one another, wherein the potential peripheral intersection creates a chain reaction that results in the autonomous vehicle colliding with one or more vehicles.

15. The autonomous vehicle of claim 10, wherein the vehicle is within proximity of the autonomous vehicle when the vehicle is located at a distance at least about twice a standard braking distance of the autonomous vehicle.

16. The autonomous vehicle of claim 10, wherein the program code, when executed by the one or more processors, further causes the broadcasting system to:
transmit, by the antenna, the real-time position, the real-time velocity, and the real-time direction as radio frequency (RF) signals.

17. A method of determining a potential collision involving an autonomous vehicle and a vehicle positioned within proximity of the autonomous vehicle, the method comprising:
receiving, by an antenna, asynchronous RF signals generated by the vehicle, wherein the asynchronous RF signals indicate a specific real-time position, a specific real-time velocity, and a specific real-time direction of travel of the vehicle;
determining, by a computer, a status of the asynchronous RF signals generated by the vehicle, wherein the status indicates a presence of prior messages generated by the vehicle that are saved in memory of the computer;
in response to determining the presence of prior messages in the memory of the computer, determining, by the computer, a vector diagram including a first forecast vector corresponding to the autonomous vehicle and a second forecast vector; and
estimating an occurrence of a possible intersection between the first forecast vector and the second forecast vector, wherein the possible intersection represents the potential collision; and
determining at least one vehicle control action to be executed by the autonomous vehicle to avoid the potential collision between the autonomous vehicle and the vehicle in response to determining the occurrence of the possible intersection of the first forecast vector and the second forecast vector, wherein the at least one vehicle control action comprises swerving, changing lanes or turning to avoid the potential collision.

18. The method of claim 17, comprising assigning a specific identification indicator and record that corresponds to the vehicle and adding the record corresponding to the vehicle to the vector diagram in response to determining no prior messages are saved in the memory of the computer.

19. The method of claim 17, further comprising transmitting RF signals indicating a real-time position, real-time velocity, and real-time direction of travel of the autonomous vehicle.

20. The method of claim 19, wherein the RF signals are transmitted at timed intervals.

21. The method of claim 20, further comprising adjusting the timed intervals based on the real-time velocity of the autonomous vehicle.

22. The method of claim 20, further comprising adjusting the timed intervals based on current traffic conditions and operating conditions of the autonomous vehicle.

23. The autonomous vehicle of claim 16, wherein the RF signals are transmitted by the antenna at timed intervals.

24. The autonomous vehicle of claim 23, wherein the timed intervals are adjusted based on the real-time velocity of the autonomous vehicle.

25. The autonomous vehicle of claim 23, wherein the timed intervals are adjusted based on current traffic conditions and operating conditions of the autonomous vehicle.

26. The autonomous vehicle of claim 10, wherein the broadcasting system comprises a plurality of sensing modalities in communication with the one or more processors and configured to detect objects unable to transmit wireless signals.

27. An autonomous vehicle including a broadcasting system, wherein a vehicle is positioned within proximity of the autonomous vehicle, the broadcasting system comprising:
- an antenna configured to send and receive wireless communication, wherein the antenna receives publically available wireless signals;
- a plurality of sensors configured to generate signals indicating a real-time velocity and direction of travel of the autonomous vehicle;
- one or more processors in communication with the antenna and the plurality of sensors; and
- a memory coupled to the one or more processors, the memory storing data comprising program code that, when executed by the one or more processors, causes the broadcasting system to:
  - receive as input the publically available wireless signals, the signals generated by the sensors, and asynchronous RF signals generated by the vehicle, wherein each asynchronous RF signal indicates a specific real-time position, a specific real-time velocity, and a specific real-time direction of travel of the vehicle;
  - determine a real-time velocity and real-time direction of travel of the autonomous vehicle based on the signals generated by the sensors;
  - determine a real-time position of the autonomous vehicle based on the publically available wireless signals; and
  - generate a vector diagram that estimates a first forecast vector at a specific point in time in an immediate future based on the real-time velocity and the real-time direction of travel of the autonomous vehicle and a second forecast vector at the specific point in time in the immediate future based on the real-time velocity and the real-time direction of travel of the vehicle, wherein the vehicle is within proximity of the autonomous vehicle when the vehicle is located at a distance at least about twice a standard braking distance of the autonomous vehicle.

28. The autonomous vehicle of claim 27, wherein the program code, when executed by the one or more processors, further causes the broadcasting system to:
- transmit, by the antenna, the real-time position, real-time velocity, and real-time direction of travel of the autonomous vehicle as RF signals, wherein the RF signals are transmitted at timed intervals that are adjustable based on certain conditions.

29. The autonomous vehicle of claim 27, wherein the broadcasting system comprises a plurality of sensing modalities in communication with the one or more processors and configured to detect objects unable to transmit wireless signals.

* * * * *